Nov. 4, 1958
R. F. RISSE
2,858,932
TENSIONING DEVICE FOR FLEXIBLE SUPPORT
STRANDS OF AN ENDLESS CONVEYOR
Filed Oct. 18, 1955
2 Sheets-Sheet 1
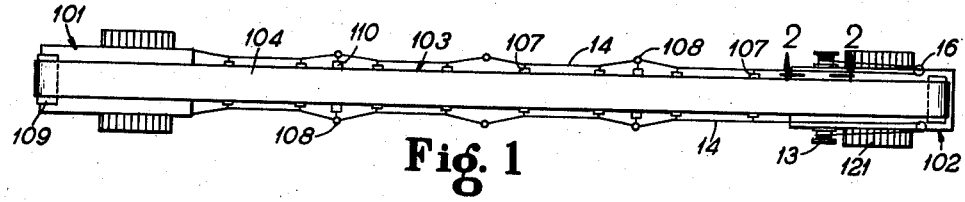
Fig. 1
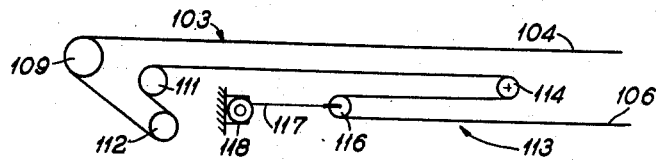
Fig. 1a
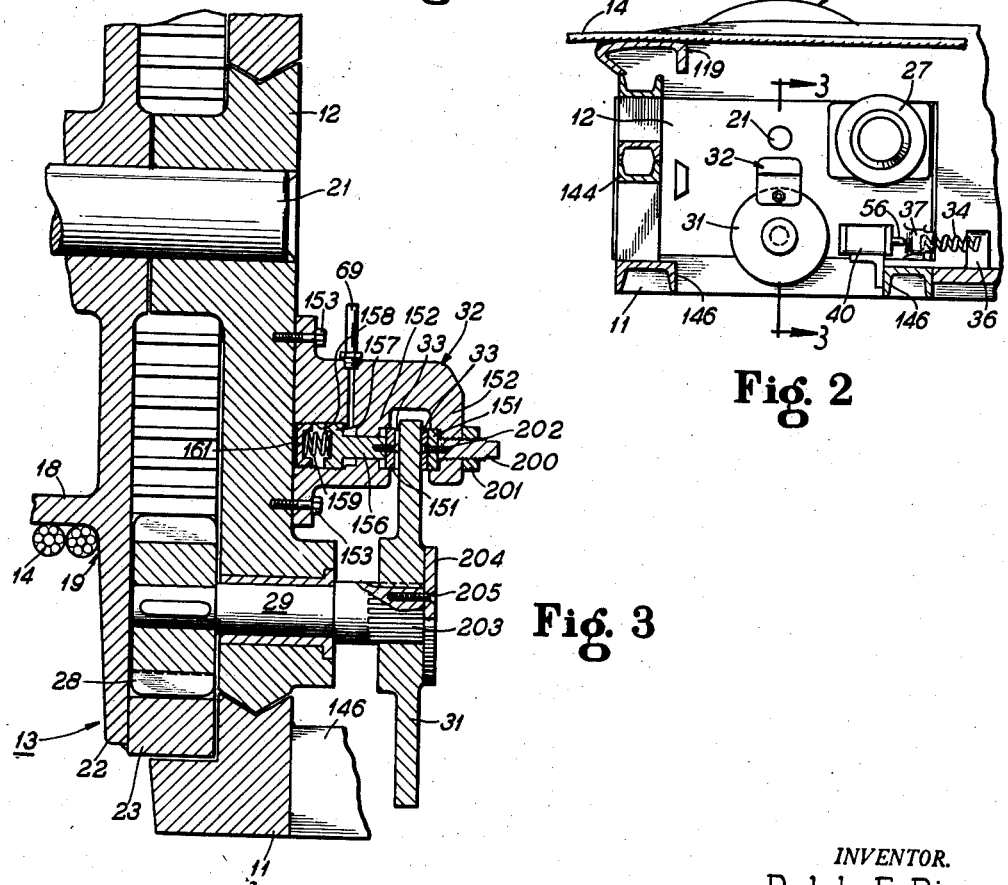
INVENTOR.
Ralph F. Risse
BY
Murray G. Gleeson
ATTORNEY Nov. 4, 1958

R. F. RISSE 2,858,932

TENSIONING DEVICE FOR FLEXIBLE SUPPORT
STRANDS OF AN ENDLESS CONVEYOR

Filed Oct. 18, 1955

INVENTOR.
Ralph F. Risse

BY
Murray G. Gleeson
ATTORNEY

United States Patent Office 2,858,932
Patented Nov. 4, 1958

2,858,932
TENSIONING DEVICE FOR FLEXIBLE SUPPORT STRANDS OF AN ENDLESS CONVEYOR

Ralph F. Risse, Chicago, Ill., assignor to Goodman Manufacturing Company, Chicago, Ill., a corporation of Illinois Application October 18, 1955, Serial No. 541,154

22 Claims. (Cl. 198—139)

This invention relates generally to extensible belt conveyors of the type which have the conveying reach supported upon spaced flexible strands, and more particularly to devices for maintaining the proper amount of tension upon the strands, yet capable of readily paying out or reeling in such strand when the conveyor is lengthened or shortened.

According to the present invention the flexible support strands are wound upon hydraulically driven winches, such winches being mounted for movement with respect to the tail section of an extensible conveyor. Means are provided which are operable upon movement of the support for the winch to supply pressure fluid to wind the strand upon the winch and restore the desired tension in the strand.

One of the principal objects of this invention is to provide a take up device for the flexible support strands of an extensible conveyor, which device will maintain proper tension in the support strands at all times and which will pay out such strands when the conveyor is lengthened. Other objects and important features of the invention will be apparent from a study of the specification following taken with the drawing, which together describe and illustrate a preferred embodiment of the invention and what is now considered to be the best mode of practicing the principles thereof. Other embodiments may be suggested to those having the benefit of the teachings herein, and it is therefore intended that the scope of the invention not be limited by the precise embodiment herein shown, such other embodiments being intended to be reserved especially as they fall within the scope of the subjoined claims.

In the drawings, Figure 1 is a plan view of an extensible strand-sideframe belt conveyor with which the present invention may be usefully employed;

Figure 1a is a fragmentary side view of the conveyor belt shown in Figure 1;

Figure 2 is a fragmentary enlarged cross-sectional view of the tail section of the conveyor shown in Figure 1, taken along the line 2—2;

Figure 3 is a cross-sectional view of Figure 2 taken along the line 3—3; and

Figure 4:
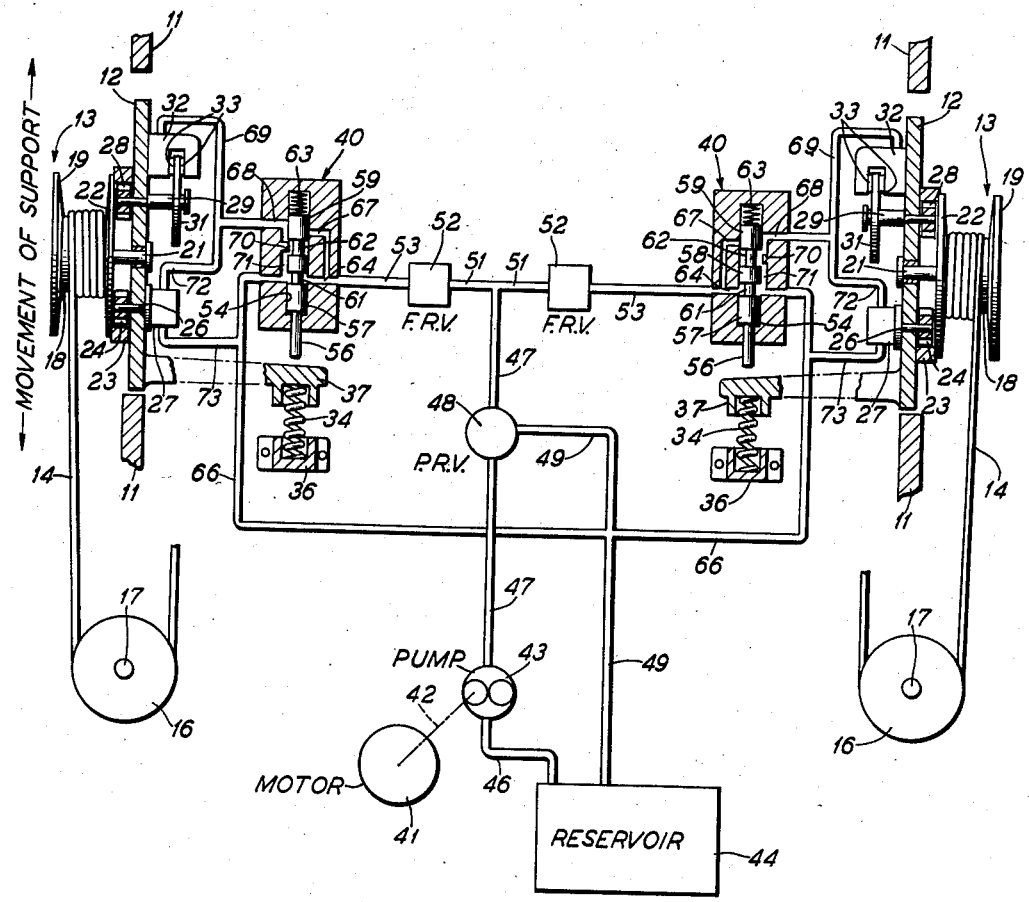
Figure 4 is a schematic diagram of a preferred form of circuit for maintaining tension on the strand means within a predetermined range. The invention herein is particularly adaptable to an extensible conveyor of the type as disclosed in Hardy application, Serial No. 541,162, filed October 18, 1955 for Improvements in Extensible Conveyor.

Referring first to the general outline of the conveyor shown in Figures 1 and 1a, the conveyor comprises a head section 101, a tail section 102 spaced a distance inby from the head section, an endless belt 103 trained for orbital movement between the head and tail sections and having a load-carrying reach 104 movable from the tail section toward the head section, strand means 14, 14 trained along a course between the sections, and belt support means comprising roller assemblies 107 carried by the strand means and furnishing support for the load-carrying reach. The strand means, which comprises a pair of wire ropes in the present instance, is supported at intervals on standards 108 which also carry return rollers 110 supporting the belt return reach 106.

For a more detailed description of the strand sideframe type conveyor, reference should be made to Craggs & McCann Patent No. 2,773,257 issued December 4, 1956.

The head section includes a direction-reversing pulley 109, and a pair of drive pulleys 111, 112. The belt is trained into a storage loop 113 about a fixed pulley 114 and a movable pulley 116, the latter being biased leftwise in Figure 1a, in a direction to increase the storage loop, through cable 117 and a suitable power winch 118 which is carried by the head section. This power winch is not described in detail here but reference may be had to copending application of Craggs & McCann, Serial No. 548,622 filed November 23, 1955 for a generally similar power winch.

At the tail section there is a pair of winches or winding drums 13, 13 mounted on each side about which the ends of respective ones of the strands are wound. As will be seen in Figure 2, the strand means is drawn into the tail section over a supporting ledge 119, around a sheave 16 and thence to the respective drum 13.

The tail section 102 comprises a pair of sideframe members 11, 11 which are maintained in spaced apart relationship by suitable structural cross members including for example members 144 and 146. The frame is arranged to be moved forward or backward on endless crawler treads 121 by a driving arrangement not specifically shown.

The conveyor shown in the aforesaid application has a pair of support strands which are spaced laterally of each other for supporting the conveying reach of an extensible belt conveyor. According to the present invention such support strands are maintained at a predetermined tension and are individually wound upon winches which are arranged to maintain the proper tension upon the strands and to pay out or reel in the strands in accordance with the position of a tail unit of such conveyor.

Referring now to Figure 4 the tail unit of such a conveyor may consist of side frame members 11, 11. Each of the side frame members supports a carriage 12 which is movable with respect to its adjacent side frame member 11, each of said supports mounting a winch referred to generally by the reference numeral 13, and arranged to wind in or pay out a flexible strand 14 which supports the conveying reach of a conveyor of the type as disclosed in the aforesaid Hardy and Ogden application.

As seen in the drawing the support strand 14 may be reversed in direction around a sheave 16 arranged to turn on a pin 17 at such tail unit. Each strand 14 is arranged to be wound upon a hub 18 of a reel 19 of the winch 13. The hub 18 is arranged to turn upon a shaft 21 mounted on the carriage 12, and the reel 19 has a flange 22 to which is affixed an internal ring gear 23.

A pinion 24 meshes with the internal ring gear and is fixed upon a shaft 26 extending through the carriage 12, said shaft being driven by a fluid motor 27.

The internal ring gear 23 also meshes with a pinion 28 fixed upon a shaft 29 having fixed thereto a braking disk 31 engageable by a fluid operated brake 32 having spaced braking shoes 33 which are released by application of pressure fluid to the brake 32.

As seen in Figure 3, the brake 32 comprises the two spaced parallel friction brake shoes or discs 33, aforementioned. Each is backed by a strengthening disc 151. Each pair of elements 33, 151 comprises a replaceable subassembly supported in one of a pair of spaced jaws 152 forming part of a housing held to the movable frame 12 by cap screws 153. One of the brake shoe members 33 is mounted on a pilot extension 156 of a piston 157 which is slideable in a bore 158 in the jaw portion 152. The piston 158 is biased by a spring 159, the other end of the spring being bottomed against a cup-shaped member 161 threaded into the end of the bore. The other of the brake discs 33 is held on the end of an adjusting screw 200 which is threadedly engaged with the outer jaw 152 and held in place by a lock nut 201. Both brake discs 33 are held in place by screws 202, all as shown in Figure 3. There is a splined connection 203 between the braking disc 31 and its shaft 29 which permits floating adjusting movement of the disc longitudinally of its shaft so as to automatically center itself between the friction discs 33, 33. A retainer plate 204 is held on the end of the shaft 29 as by means of a plurality of screws 205.

Under conditions when no pressure obtains in the line 69, as is the condition in Figure 4, the piston 157 is urged by the spring 159 firmly to hold the brake disc 31 against rotation, at the same time holding the internal ring gear 23 and the reel 19 against rotation. It will be obvious, of course, that no differential pressure exists across the reel drive motor 27, as both sides thereof are connected to tank.

The winch 13 together with its driving motor 27 and the fluid operated brake 32 is arranged to move with the carriage 12 with respect to the frame members 11, 11. The carriage 12 is constantly urged by a spring 34 which is bottomed at one end at a bracket 36 fixed to the frame member 11, the other end of the spring 34 being bottomed against an arm 37 extending from the carriage 12. The load in the spring 34 tends to move the carriage 12 in a direction opposed to that of the tension in the strand 14.

The spring 34 forms part of means to restore the tension in the strand 14 to the proper value and the spring 34 and the arm 37 control the operation of a control valve indicated generally by the reference numeral 40, which controls the admission of fluid to the brake 32 and the fluid motor 27.

The control valve 40 is accordingly connected in circuit with a fluid pressure system shown which comprises a drive motor 41 connected by a shaft 42 to drive a fluid pressure pump 43. A reservoir 44 is connected by a line 46 to the pump 43 and the output from the pump 43 is by way of a pressure line 47 connected thereto, the pressure from the pump 43 being regulated by a pressure relief valve 48 having a line 49 connected thereto back to the tank or reservoir 44.

The pressure line 47 from the pressure relief valve 48 has a pair of pressure lines 51, 51 branching therefrom, the pressure fluid being apportioned between the two branching lines 51, 51 by a flow regulating valve 52 connected in each branching line. A pressure passageway 53 is connected to the flow regulating valve 52 to the control valve 40.

The control valve 40 has a bore 54 therein in which a spool valve member 56 is slidable. The spool valve member 56 has lands 57, 58 and 59, lands 57 and 58 being spaced by a portion of reduced diameter 61, and lands 58 and 59 being spaced by a portion of reduced diameter 62. The spool valve member 56 is biased by a spring 63 to the position seen in the figure, pressure fluid in the line 53 being normally bypassed by a port 64 past the reduced portion 61 to a tank or return line 66, connected to tank line 49.

The body of the control valve 40 has a pressure port 67 which branches from the pressure line 53, and normally this pressure port is blocked by the land 59. A working port 68 communicates with the bore 54 and is connected by a pressure conduit 69 to the brake 32.

Under the condition seen in Figure 4, any pressure in the line 69 is relieved past the reduced portion 62 and past an exhaust port 71 to the tank line 66.

It will be apparent also that no differential pressure exists across the fluid motor 27 as both sides thereof are connected to tank, the fluid motor having one side thereof connected by a conduit 72 to the line 69, and the other side of the fluid motor 27 being connected by a conduit 73 to the tank line 66.

Consider now the condition obtaining when the carriage 12 moves with respect to its respective frame member 11 by reason of the reduced tension in the strand 14 and the urgence of the spring 34. The load in the spring 34 is set at a value greater than the lower limit of desired tension in the strand 14, and when the tension in the strand 14 falls below the lower limit the spring 34 is operable to shift the arm 37 and the carriage 12 until the arm 37 moves the valve member 56. Such movement of the valve member 56 causes the land 57 thereof to lap the port 64. Land 58 under such condition laps at 70, and pressure fluid is effective past the reduced portion 62 to perform two functions.

One of these functions is to release the brake 32, and to release the brake disk 31. Concomitantly pressure fluid is supplied to the fluid motor 27 to wind the reel 19 in a direction once more to place a desired tension upon the strand 14. When the desired tension is reached in the strand 14 the carriage 12 will shift to compress the spring 34 and return the valve member 56 to its original position.

Consider now the condition obtaining when an inby unit, having the frames 11, 11 as a part thereof, is caused to move, as by crawler treads or the like, not shown, in a direction to follow the advance of working face in a mine or the like. Under such condition the winch 13 will be required to pay out an additional length of strand 14. Such initial movement will place an additional amount of tension upon the strand 14, but the valve 40 will continue to remain in the position seen in the drawing. However, the winch 13 in paying out cable will cause the fluid drive motor 27 therefor to be driven as a pump thereby causing the motor to be driven in a closed circuit consisting of line 72 through the valve 40 and the conduit 66 and conduit 73.

The drag imposed by the brake 32 is not sufficient to prevent paying off of the strand 14 from the winch 13 upon this latter condition, and the output from the motor 27 in acting as a pump upon this latter condition will operate also to reduce the drag of the brake 32 greatly.

Thus, it will be seen that the adjusting screw 200 determines the friction of the shoes 33, 33 against the disc 31 and hence the upper limit of tension in the strand means. The lower limit is determined by the spring 34.

From the foregoing description it is believed evident that a valuable improvement has been made in the field of extensible conveying equipment. At all times the support strands for the conveying reach are maintained within desired limits of tension. Likewise the means for maintaining desired tension upon the strand is effective also for enabling additional lengths thereof to be payed out as required.

While the invention has been described in terms of a preferred embodiment thereof, its scope is intended to be limited only by the claims here appended.

I claim as my invention:

1. In an extensible conveyor of the type having head and tail sections and at least one strand extending therebetween for supporting a conveying reach of an endless belt, the improvement in such conveyor for maintaining proper tension on said strand and for paying same out in accordance with the extension of said conveyor comprising a support mounted on one of said sections and movable with respect thereto, a winch including a fluid operated motor therefor, said winch being connected to said strand, a fluid pressure circuit including a pump and a valve connected therein for controlling flow of pressure fluid to said fluid operated motor, means biasing said support in a direction to maintain a predetermined amount of tension on the strand connected to said winch, means carried by said support for actuating said valve to operate said fluid motor and said winch to wind said strand on said winch, and a brake on said winch including a fluid operator therefor which is actuated for release of said brake when fluid is supplied to said fluid operated motor.

2. In an extensible conveyor of the type having head and tail sections and at least one strand extending therebetween for supporting a conveying reach of an endless belt, the improvement in such conveyor for maintaining proper tension on said strand and for paying same out in accordance with the extension of said conveyor comprising a support mounted on one of said sections and movable with respect thereto, a winch including a fluid operated motor therefor, said winch being connected to said strand, a fluid pressure circuit including a pump and a valve connected therein for controlling flow of pressure fluid to said fluid operated motor, means biasing said support in a direction to maintain a predetermined amount of tension on the strand connected to said winch, means carried by said support for actuating said valve to operate said fluid motor and said winch to wind said strand on said winch, and a brake for imposing a drag on said winch.

3. In an extensible conveyor of the type having head and tail sections and at least one strand extending therebetween for supporting a conveying reach of an endless belt, the improvement in such conveyor for maintaining proper tension on said strand and for paying same out in accordance with the extension of said conveyor comprising a support mounted on one of said sections and movable with respect thereto, a winch including a fluid operated motor therefor, said winch being connected to said strand, a fluid pressure circuit including a pump and a valve connected therein for controlling flow of pressure fluid to said fluid operated motor, means biasing said support in a direction to maintain a predetermined amount of tension on the strand connected to said winch, and means carried by said support for actuating said valve to operate said fluid motor and said winch to wind said strand on said winch.

4. Apparatus of the class described for maintaining tension on a flexible strand including a fluid pressure operated winch for paying out said strand and winding same thereon at predetermined tension, a carriage which is movable in accordance with the tension on said strand, means biasing said carriage in a direction to maintain tension on said strand, fluid pressure means including a source of pressure fluid and a valve connected in a fluid pressure circuit therewith, said valve being controlled by the movement of said carriage and being operable to control said winch to impose a predetermined amount of tension on said strand, and a brake on said winch including a fluid operator therefor connected in circuit with said winch, said operator being actuated for release of said brake when pressure fluid is supplied to said winch.

5. Apparatus of the class described for maintaining tension on a flexible strand including a fluid pressure operated winch for paying out said strand and winding same thereon at predetermined tension, a carriage which is movable in accordance with the tension on said strand, means biasing said carriage in a direction to maintain tension on said strand, fluid pressure means including a source of pressure fluid and a valve connected in a fluid pressure circuit therewith, said valve being controlled by the movement of said carriage and being operable to control said winch to impose a predetermined amount of tension on said strand, and a brake on said winch including a fluid operator therefor which is actuated for release of said brake when pressure fluid is supplied to said winch.

6. Apparatus of the class described for maintaining tension on a flexible strand including a fluid pressure operated winch for paying out said strand and winding same thereon at predetermined tension, a carriage which is movable in accordance with the tension on said strand, means biasing said carriage in a direction to maintain tension on said strand, fluid pressure means including a source of pressure fluid and a valve connected in a fluid pressure circuit therewith, said valve being controlled by the movement of said carriage and being operable to control said winch to impose a predetermined amount of tension on said strand, and a brake for imposing a drag on said winch.

7. Apparatus of the class described for maintaining tension on a flexible strand including a fluid pressure operated winch for paying out said strand and winding same thereon at predetermined tension, a carriage which is movable in accordance with the tension on said strand, means biasing said carriage in a direction to maintain tension on said strand, and fluid pressure means including a source of pressure fluid and a valve connected in a fluid pressure circuit therewith, said valve being controlled by the movement of said carriage and being operable to control said winch to impose a predetermined amount of tension on said strand.

8. In an extensible conveyor, a head section; a tail section spaced from said head section; strand means trained along a course between said sections; and belt support means carried by said strand means for supporting a load-carrying reach of a belt; the improvement comprising in combination with said sections of strand tensioning means at one of said sections including control means operable responsive to the tension in said strand means to maintain said tension at a predetermined value.

9. In an extensible conveyor, a head section; a tail section spaced from said head section; strand means trained along a course between said sections; and belt support means carried by said strand means for supporting a load-carrying reach of a belt; the improvement comprising in combination with said sections of strand tensioning means carried by one of said sections including power operated means actuatable to draw said strand means toward said one section, sensing means effective to sense the tension in said strand means, and control means operably associated with said power operated means and with said sensing means and effective to actuate said power operated means responsive to strand means tension below a predetermined minimum.

10. In an extensible conveyor, a head section; a tail section spaced from said head section; strand means trained along a course between said sections; and belt support means carried by said strand means and supporting a load-carrying reach of a belt trained between the sections; the improvement comprising in combination with said sections of strand tensioning means carried by said tail section including winding means about which said strand means is wrapped, power means coupled to said winding means and actuatable to move the latter in a winding direction, sensing means effective to sense the tension in said strand means, and control means operably associated with said winding means and said sensing means and being effective to actuate said power means to move said winding means in a winding direction responsive to tension below a predetermined minimum value in said strand means and being further effective to enable said winding means to move in an unwinding direction responsive to tension above a predetermined maximum value in said strand means.

11. An extensible conveyor comprising in combination a head section; a tail section spaced from said head section; a belt trained between said sections and having a load-carrying reach movable from the tail section toward the head section; strand means trained along a course between said sections; belt support means carried by said strand means and supporting said load-carrying reach; means for moving said tail section relative to said head section in a direction aligned with said course to change the effective length of said conveyor; means at said tail section for paying off and taking in said strand means in accordance with said movement of the tail section;

strand tensioning means at said tail section operable to selectively pay off or take in said strand means to apply a predetermined value of tension in said strand means to effectively support said belt support means; control means for said strand tensioning means including means for sensing the tension in said strand means and means responsive to said sensing means for operating said strand tensioning means to maintain the tension at said predetermined value.

12. In an extensible strand-side frame conveyor having spaced-apart end sections with strand means extending from one of said sections toward the other for supporting a belt for movement between said sections, the improvement in said conveyor comprising strand tensioning means at said one section including a movable control member, biasing means urging said control member for movement in one direction, means urging said control member for movement in the opposite direction in response to tension in said strand means, and means for modifying the operation of said strand tensioning means in response to movement of said control member.

13. In an extensible strand-sideframe conveyor of the type having head and tail sections with strand means extending therebetween for supporting a belt which is orbitally movable between said sections, the improvement for maintaining a predetermined tension in said strand means comprising winch means and motor means therefor carried by one of said sections, said strand means being wrapped about said winch means, control means for said motor means including a movable control member carried by one of said sections, means biasing said control member for movement in one direction, means urging said control member for movement in the opposite direction in response to tension in said strand means, and means controlling the operation of said motor means in response to the position of said movable control member for modifying the tension applied to the strand means by the winch means.

14. In an extensible conveyor of the type having head and tail sections supporting laterally spaced strands for supporting a conveying reach of an endless belt, the improvement in such conveyor for maintaining proper tension on at least one of said strands and for winding in and paying out same in accordance with change in length of said conveyor comprising a support mounted on one of said sections and movable with respect thereto, a winch having said strand wrapped thereon, a fluid motor for said winch, a fluid pressure circuit including a pump and a valve connected therein for controlling flow of fluid under pressure to said motor, an operative connection between said valve and said support, means biasing said support in one direction, and means for urging said support in the opposite direction responsive to tension in said strand for regulating said motor in accordance with the said strand tension.

15. In an extensible conveyor of the type having head and tail sections supporting laterally spaced strands for supporting the conveying reach of an endless belt, the improvement in such conveyor for maintaining proper tension on at least one of said strands and for winding in and paying out same in accordance with change in length of said conveyor comprising a support mounted on one of said sections and movable with respect thereto, a winch having said strand wrapped thereon, a fluid motor for said winch, a fluid pressure circuit including a pump and a valve connected therein for controlling flow of fluid under pressure to said motor, an operative connection between said valve and said support, means biasing said support in one direction, means for urging said support in the opposite direction responsive to tension in said strand for regulating said motor in accordance with the said strand tension, and a brake for said winch with means for actuating said brake concurrently with regulation of said motor.

16. In an extensible conveyor, the combination of: head and tail sections having an endless conveyor belt trained for orbital movement therebetween; belt drive means carried by one of said sections; belt storage means including a take-up loop and belt biasing means urging said loop in a direction to maintain tension on the belt; means for moving said tail section away from the head section to extend the belt while concurrently reducing the take-up loop against the urgence of said belt biasing means; flexible strand means trained along said belt and extending between said sections; belt-supporting roller means supported by said strand means to provide support for the belt intermediate said sections; one portion of said strand means being mounted on tensioning means carried by said tail section and operable to pay out said strand means as the tail section is moved to extend the belt; and control means for said tensioning means effective to maintain a predetermined tension in said strand means as it is payed out, said tensioning means including a power operated winch mounted upon a support which is movable with respect to said tail section, means for moving said support in response to change of tension in said strand means, and means for regulating the operation of said winch in response to movement of said movable support.

17. The combination of claim 16 including a brake for said winch, and means automatically enabling said brake to hold said winch against unwinding movement at a position of said movable support corresponding to a predetermined tension in said strand means.

18. In an extensible conveyor, the combination of: head and tail sections having an endless conveyor belt trained for orbital movement therebetween; belt drive means carried by one of said sections; belt storage means including a take-up loop and belt biasing means urging said loop in a direction to enlarge the loop; means for moving said tail section alternately away from or towards the head section to respectively extend or retract the belt while concurrently reducing or enlarging the take-up loop against or with the urgence of the belt biasing means; flexible strand means trained along said belt and extending between said sections; belt-supporting roller means supported by said strand means to provide support for the belt intermediate said sections; one portion of said strand means being mounted on power tensioning means which is carried by said tail section and which is operable to pay out said strand means responsive to movement of the tail section in a direction to extend the belt and which is further operable to reel in said strand means responsive to movement of the tail section in a direction to shorten the belt; and control means for said tensioning means being effective in response to changes of tension in said strand means beyond predetermined upper and lower limits to restore said tension to said limits by paying out or reeling in said strand means.

19. In an extensible conveyor, the combination of: a head section; a tail section; a pulley in each section; an endless conveyor belt trained about said pulleys; drive means in one of said sections for rotatably driving a pulley to orbitally move said belt; a take-up pulley movable toward and away from one of said other pulleys; said belt having a take-up loop trained about said take-up pulley; means urging said take-up pulley in a direction to tension said loop; a pair of flexible strands trained along opposite sides of said belt and extending between said sections; roller means supported by said strands and in turn supporting said belt; a pair of winding drums mounted on the tail section and having respective ones of said flexible strands wound thereon; drum driving means for rotatably driving said drums in a direction to wind said strands; a support for each of said winding drums being movable with respect to said tail section to and from a position corresponding to a predetermined limit for the tension in the respective strand, means for moving the support in response to change in tension in said strand, and control means for said drum driving means effective to actuate said driving means to drive the respective drum in response to movement of its respective support to its aforesaid position.

20. In an extensible conveyor, the combination of: a head section; a tail section; a pulley in each section; an endless conveyor belt trained about said pulleys; drive means in one of said sections for rotatably driving a pulley to orbitally move said belt; a pair of flexible strands trained along opposite sides of said belt, each having one end anchored adjacent the head section; roller means suspended between said strands for supporting said belt; a pair of winding drums mounted on the tail section and having the other ends of said flexible strands wound thereon; a support for each of said winding drums movable with respect to said tail section to and from a position corresponding to a predetermined lower limit for the tension in the respective strand, means for moving said support to said position responsive to reducing tension in said strand, means for moving said support away from said position responsive to increasing tension in said strand, driving means for rotatably driving each of said drums in a direction to wind strand thereon, and means for maintaining tension in each of said strands above said predetermined limit comprising control means for actuating the corresponding driving means in a winding direction responsive to movement of the corresponding support to its said lower limit position.

21. The combination of claim 20 including means paying off strand from either of said drums responsive to rise of tension in said strand to a predetermined maximum value.

22. In an extensible conveyor, the combination of: a head section having a pulley therein; a tail section having a pulley therein; an endless conveyor belt trained for orbital movement about said pulleys; drive means in one of said sections for rotatably driving a pulley; said belt having a take-up loop; power means for extending the take-up loop; and control means for said power means effective to actuate the latter to tighten the belt responsive to a predetermined minimum belt tension and effective to release the belt responsive to a predetermined maximum belt tension; a pair of flexible strands trained along said belt, each having one end anchored adjacent the head section; roller means suspended between said strands and supporting said belt; said tail section having power tensioning means for each of said strands; control means for said strand tensioning means effective to actuate the latter to tighten each of the strands responsive to a predetermined minimum strand tension and effective to release each of the strands responsive to a predetermined maximum strand tension; and means for moving the tail section forward and backward relative to the head section to extend and retract the belt.

No references cited.